United States Patent Office 3,437,466
Patented Apr. 8, 1969

3,437,466
PRECIPITATION OF PARTICULATE SUSPENSIONS IN HYDROCARBON SYSTEMS
Roy J. Betty, Chicago, Byron E. Marsh, Western Springs, and Frederick S. Marsh, Chicago, Ill., assignors, by mesne assignments, to Armour Industrial Chemical Company, a corporation of Delaware
No Drawing. Filed Aug. 28, 1967, Ser. No. 663,496
Int. Cl. C10g 29/20; C10l 1/22
U.S. Cl. 44—71                                                              6 Claims

ABSTRACT OF THE DISCLOSURE

A method of precipitating particulate matter that reside as suspensions in hydrocarbons such as gasoline, kerosene, etc., by adding long chain $\beta$-aliphaticpropionamide to the hydrocarbon compound.

BACKGROUND

Prior to this invention, a great deal of damage was caused by particulate matter suspensions, e.g., iron oxide and sludge suspensions in hydrocarbons such as gasoline, kerosene, jet fuel, petroleum distillates and the like. These particulate materials tended to block transporting lines, such as fuel lines in aircraft, fuel burners, etc., and adversely affected the proper combustion of the hydrocarbon such as in a burner or internal combustion engine. Such disruption of the operation of internal combustion engines occurred irrespective of whether compression ignition or spark ignition were utilized. Also, the particles had a tendency to become lodged in the intake valves, injection nozzles and injection plungers of combustion engines.

Methods have been proposed, such as combining dispersing additives with the hydrocarbons, to disperse the sludge and the suspended particles. One such method is disclosed in U.S. Patent 2,805,925. This reference is directed to the use of different compounds to disperse particulate matter in hydrocarbons and recognizes that an inordinate amount of damage can occur from foreign particles in hydrocarbons, especially if the hydrocarbon is destined to be used as a fuel. Another method utilized to minimize effects of sludge formation is the addition of compounds to inhibit sludge formation as exemplified by U.S. Patent 2,892,690. The aforementioned references to methods of inhibiting and dispersing particulate matter in hydrocarbons do not, however, cure the problem, but merely alleviate it to a degree. In the aforementioned methods, the particles are not removed, but formation of internal sludge is inhibited and sludge and foreign particles are instead evenly distributed throughout the hydrocarbon composition. It is understood that it would be preferable to remove the particulate suspensions such as oxide particles, sludge and the like from the hydrocarbon composition in order to prevent their interference with the proper combustion of the fuel as well as to prevent clogging of transport lines.

SUMMARY OF THE INVENTION

Briefly described, this invention is directed to a method of precipitating suspended particles such as oxide particles and sludge in hydrocarbons by adding to the hydrocarbon compound at least one part per million of a $\beta$-aliphaticaminopropionamide. The $\beta$-aliphaticaminopropionamides that are utilized in accordance with this invention are prepared from the reaction of long chain fatty amines and diamines with acrylamide. The compounds that are utilized in hydrocarbon compounds in accordance with this invention are of the general formula

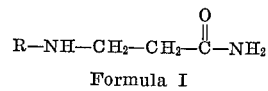

Formula I wherein R is an aliphatic radical selected from the group consisting of normal alkyl, normal alkenyl, secondary alkyl, normal alkyl-$NH(CH_2)_n$-, normal alkenyl-$NH(CH_2)_n$-, and secondary alkyl-$NH(CH_2)_n$- wherein said alkyl and alkenyl radicals have from about 6 to 22 carbon atoms and $n$ is an integer from 2 to 4.

One preferred embodiment utilizes $\beta$-alkylamino propionamides of the formula

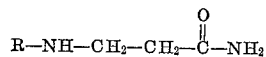

wherein R is selected from the group consisting of

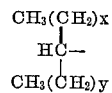

and

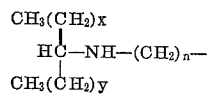

wherein $x$ and $y$ are integers having a sum from about 3 to 19 and $n$ is an integer from 2 to 4. One especially suitable subclass has $n$ equal 3.

The preparation of the $\beta$-aliphaticaminopropionamides utilized in this invention occurs through the reaction of aliphatic amines with acrylamide in accordance with the following reaction:

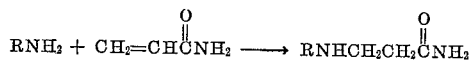

wherein R is defined as in Formula I above. The reaction may be carried out by addition of the amine to a container and heating to about 60° to 100° C. and slowly adding about an equal molar amount of acrylamide. The mixture may then be stirred for a 15 to 60 minute period at a temperature of from about 80° to 100° C. and may be filtered through a pressure filter to remove any polyacrylamide. Almost quantitative yields of product are obtained by this method.

The hydrocarbon compositions in this invention are clarified through the addition of as little as less than one part per million of the $\beta$-aliphaticaminopropionamide. Different hydrocarbon compositions and various suspended materials may require a somewhat different amount of $\beta$-aliphaticaminopropionamide additive to effectively settle the undesirable material in a very short period of time. Thus, it has been found that from about 0.1 to 5 p.p.m. of additive in gasoline is especially effective in settling suspended fuel oil sludge. From about 5 to 50 p.p.m. is effective in settling fuel oil sludge and iron oxide in heavier hydrocarbons such as kerosene and diesel fuel. Therefore, it is seen that an effective concentration of more than about 0.1 p.p.m. additive is suitable to achieve very rapid settling of particulate matter in hydrocarbon compositions. Generally, from 0.1 to 100 p.p.m. of additive is suitable in the process of this invention. An excess of 100 p.p.m. may be used, but is undesirable from an economic standpoint.

In accordance with this invention, the term "hydrocarbon" is meant to include both aliphatic hydrocarbons such as gasoline, kerosene, jet fuel, fuel oil etc., and aromatic hydrocarbons such as benzene, toluene, xylene, naphthalene and the like as well as the substituted aromatics such as styrene, divinyl benzene, $\alpha$-methylstyrene, etc. Additionally, mixtures of the aforementioned hydrocarbon compounds may also be included. Thus, the process of this invention may be used to clear foreign matter from a wide variety of hydrocarbon cleaning compositions and the like.

This invention is further illustrated by the following specific examples.

Example I

β-($C_{11}$–$C_{14}$ sec-alkylamino) propionamide was prepared in the following manner. A 100 ml. round bottom flask equipped with a thermometer and magnetic stirrer was charged with 57.9 g. (0.3 mole) of $C_{11}$–$C_{14}$ sec-alkylamine. The temperature was raised to 90° C. and 23.4 g. (0.33 mole) of acrylamide was added portionwise over a 15 minute period. The mixture was stirred at 85–95° C. for one hour, then filtered through a pressure filter to remove any polyacrylamide. The crude product was obtained as a yellow oil, 77.0 g. (95.5% yield) and had the following analysis: Neutralization equivalent, 267 (calc'd 264); primary amine, 14.9%; secondary amine, 78.0%.

Example II

3-[3'-($C_9$–$C_{11}$ sec-alkylamino) propylamino] propionamide was prepared in the following manner. A 100 ml. round bottom flask equipped with a thermometer and magnetic stirrer, was charged with 44.4 g. (0.2 mole) of N-($C_9$–$C_{11}$ sec-alkyl)-1,3-propanediamine. The temperature was raised to 80° C. and 14.2 g. (0.2 mole) of acrylamide was added portionwise over a 15–30 minute period. The mixture was stirred at 80–90° C. for 30 minutes and the product obtained in almost quantative yield and had the following analysis: Neutralization equivalent, 145 (calc'd 146); primary amine, 7.0%; secondary amine, 92%.

Example III

Beta-aliphaticaminopropionamide additives were used to settle fuel oil sludge from kerosene. Concentrations of additives as set forth in Table I in a 1% kerosene stock solution were added to 100 mls. of kerosene in a bottle. Then 5 gms. of fuel oil sludge and 10 mls. of tap water were added to the bottles which were then shaken vigorously. The bottles were then allowed to stand without any movement and the time for the sludge to settle out was observed and recorded. A control was run under the same conditions with no additive. The results are shown in Table I.

TABLE I

| Chemical additive | p.p.m. | Time for particles to settle out, min. |
|---|---|---|
| Control, no additive | | [1] 72 |
| β-($C_{7-9}$ sec-alkylamino) propionamide | 10 | 15 |
| | 25 | 15 |
| | 50 | 15 |
| | 100 | 15 |
| β-($C_{11-14}$ sec-alkylamino) propionamide | 10 | 3–5 |
| | 25 | 3–5 |
| | 50 | 3–5 |
| | 100 | 3–5 |
| β-($C_{15-20}$ sec-alkylamino) propionamide | 10 | 5 |
| | 25 | 5 |
| | 50 | 5 |
| | 100 | 5 |
| 3-[2'-($C_{7-9}$ sec-alkylamino) propylamino] propionamide | 10 | 20 |
| | 25 | 20 |
| | 50 | 20 |
| | 100 | 20 |
| 3-[3'-($C_{11-14}$ sec-alkylamino) propylamino] propionamide | 10 | 15 |
| | 25 | 15 |
| | 50 | 15 |
| | 100 | 15 |

[1] Hours.

Example IV

The procedure of Example III was followed except 5 gms. of iron oxide particles were added instead of the fuel oil sludge. The results are shown in Table II.

TABLE II

| Chemical additive | p.p.m. | Time for particles to settle out, min. |
|---|---|---|
| Control, no additive | | [1] |
| β-($C_{7-9}$ sec-alkylamino) propionamide | 10 | 15 |
| | 25 | 15 |
| | 50 | 15 |
| | 100 | 15 |
| β-($C_{11-14}$ sec-alkylamino) propionamide | 10 | 3–5 |
| | 25 | 3–5 |
| | 50 | 3–5 |
| | 100 | 3–5 |
| β-($C_{15-20}$ sec-alkylamino) propionamide | 10 | 5 |
| | 25 | 5 |
| | 50 | 5 |
| | 100 | 5 |
| 3-[3'-($C_{7-9}$ sec-alkylamino) propylamino] propionamide | 10 | 20 |
| | 25 | 20 |
| | 50 | 20 |
| | 100 | 20 |
| 3-[3'-($C_{11-14}$ sec-alkylamino) propylamino] propionamide | 10 | 15 |
| | 25 | 15 |
| | 50 | 15 |
| | 100 | 15 |
| β-Cocoamino propionamide | 10 | 5 |
| | 25 | 5 |
| | 50 | 10 |
| | 100 | [2] 4 |
| 3-[3'-(cocoamino) propylamino] propionamide | 10 | 3–5 |
| | 25 | 10 |
| | 50 | 10 |
| | 100 | 20 |

[1] Indefinitely.  [2] Hours.

Example V

The procedure of Example III was followed except that 5 gms. of fuel oil sludge was added to gasoline instead of kerosene. The results are shown in Table III.

TABLE III

| Chemical additive | p.p.m. | Time for particles to settle out |
|---|---|---|
| Control, no additive | | 2 hours. |
| β-($C_{15-20}$ sec-alkylamino)-propionamide | 1 | 5 min. |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A hydrocarbon composition consisting essentially of a hydrocarbon compound selected from the group consisting of liquid hydrocarbon fuels and aromatic hydrocarbons and an effective quantity of a β-aliphaticamino-propionamide having the formula

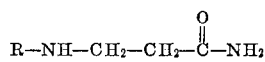

wherein R is an aliphatic radical selected from the group consisting of normal alkyl, normal alkenyl, secondary alkyl, normal alkyl-NH($CH_2$)$_n$-, normal alkenyl-NH($CH_2$)$_n$-, and secondary alkyl-NH($CH_2$)$_n$- wherein said alkyl and alkenyl radicals have from about 6 to 22 carbon atoms and $n$ is an integer from 2 to 4; said β-aliphaticaminopropionamide being effective to precipitate suspended particles in the hydrocarbon composition.

2. The hydrocarbon composition of claim 1 wherein said β-aliphaticaminopropinonamide is present in a concentration of more than 0.1 p.p.m.

3. The hydrocarbon composition of claim 2 wherein said β-aliphaticaminopropionamide is present in from 0.1 to 100 p.p.m.

4. The composition of claim 1 wherein said β-aliphaticaminopropionamide is a β-alkylaminopropionamide having the formula

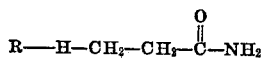

wherein R is selected from the group consisting of

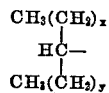

and

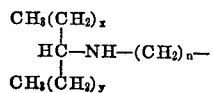

wherein $x$ and $y$ are integers having a sum from about 3 to 19 and $n$ is an integer from 2 to 4.

5. The composition of claim 4 wherein said hydrocarbon compound is gasoline and said β-alkylaminopropionamide is present in from 0.1 to 5 p.p.m.

6. The composition of claim 4 wherein said hydrocarbon compound is selected from the group consisting of kerosene and diesel fuel and said β-alkylaminopropionamide is present in from 5 to 50 p.p.m.

References Cited
UNITED STATES PATENTS

| | | | |
|---|---|---|---|
| 2,609,931 | 9/1952 | Rodman et al. | 208—180 XR |
| 2,951,031 | 8/1960 | Barclay | 208—180 |
| 3,282,827 | 11/1966 | Grysiak | 208—180 |
| 3,305,478 | 2/1967 | Gilson et al. | 208—180 |

DANIEL E. WYMAN, *Primary Examiner.*

WILLIAM J. SHINE, *Assistant Examiner.*

U.S. Cl. X.R.

252—171